United States Patent [19]

Asano et al.

[11] 4,211,690

[45] Jul. 8, 1980

[54] POLYPROPYLENE RESIN COMPOSITIONS AND MOLDINGS THEREOF

[75] Inventors: Hideki Asano; Hiroyoshi Kokaku, both of Hitachi; Katsuhito Suzuki, Mito; Kenichi Saida, Shiranuka, all of Japan

[73] Assignee: Hitachi, Ltd., Japan

[21] Appl. No.: 937,980

[22] Filed: Aug. 30, 1978

[30] Foreign Application Priority Data

Sep. 5, 1977 [JP] Japan .................................. 52-105871

[51] Int. Cl.$^2$ ...................... C08L 53/00; C08L 23/12; C08L 23/08; C08L 23/14
[52] U.S. Cl. .................................. 260/42.46; 525/88; 525/89
[58] Field of Search .................................... 525/89, 88

[56] References Cited

U.S. PATENT DOCUMENTS

| | | | |
|---|---|---|---|
| 3,262,992 | 7/1966 | Holzer et al. ..................... | 260/876 B |
| 3,562,790 | 2/1971 | Coover et al. .................... | 260/876 B |
| 3,632,674 | 1/1972 | Aishima et al. ................... | 260/876 B |
| 3,634,546 | 1/1972 | Hagemeyer et al. ............ | 260/876 B |
| 3,689,595 | 9/1972 | Gwinn .............................. | 260/876 B |
| 4,153,587 | 5/1979 | Yui ...................................... | 260/23 H |

*Primary Examiner*—Carman J. Seccuro
*Attorney, Agent, or Firm*—Craig & Antonelli

[57] ABSTRACT

The present invention provides polypropylene resin compositions of excellent gloss, impact resistance and rigidity comprising (A) 100 parts by weight of propylene homopolymer having an intrinsic viscosity in tetraline at 135° C. of no less than 1.9, (B) 40–150 parts by weight of ethylene/propylene copolymer having an intrinsic viscosity in tetralin at 135° C. of 1.4–1.7 and an ethylene content of 2–15 molar % and (C) 40–150 parts by weight of ethylene/propylene copolymer having an intrinsic viscosity in tetralin at 135° C. of no less than 1.9 and an ethylene content of 2–20 molar % or comprising above components (A) through (C) and (D) 5–120 parts by weight of a powdery inorganic filler of an average particle diameter of no more than 0.8 μm, and moldings, i.e. molded articles, prepared from these compositions.

15 Claims, No Drawings

POLYPROPYLENE RESIN COMPOSITIONS AND MOLDINGS THEREOF

BACKGROUND OF THE INVENTION

The present invention relates to polypropylene resin compositions to be used for injection molding and moldings prepared therefrom.

Polypropylene is used very widely as a general purpose resin, since it is inexpensive and it has excellent properties. Recently, more excellent properties are required of housings and casings of domestic electric appliances in many cases. For example, polypropylene of a grade which satisfies all properties of gloss, impact strength and rigidity cannot be obtained. In other words, a polypropylene having excellent gloss an impact strength has low rigidity, another polypropylene having excellent gloss and rigidity has a low impact strength and still another polypropylene having high impact strength and rigidity has poor gloss. Under the circumstances as above, a process for improving impact strength of a polypropylene of excellent gloss and rigidity by blending it with ethylene/propylene rubber was reported in Kunio Goto's "Polymer Blend", pages 168–180, published on Nov. 21, 1970. However, this process has a defect that tensile strength, bending strength and particularly rigidity and gloss and reduced seriously. There has been a study on improvement in rigidity of ethylene/propylene copolymer by incorporating an inorganic filler in an ethylene/propylene copolymer of excellent gloss and impact strength. However, this method is accompanied with a practical problem, since the gloss and impact strength are reduced by the incorporation of the powdery inorganic filler. In addition, in this method, a considerable amount of the inorganic filler is required for improving rigidity, which causes a significant reduction in tensile strength, bending strength and moldability, in addition to said reduction in gloss and impact resistance, unfavorably.

After all, there is no method of improving all of the three properties of gloss, rigidity and impact strength heretofore.

SUMMARY OF THE INVENTION

An object of the present invention is to provide a polypropylene resin composition having excellent gloss, impact strength and rigidity in moldings by overcoming the aforementioned defects of conventional techniques.

Particularly, the object of the present invention is to provide a polypropylene resin composition that forms moldings having a gloss expressed by a surface reflectance of above 80%, an impact strength expressed by an Izod impact strength of above 5 kg.cm/cm and a rigidity expressed by elastic modulus in tension of above 12,000 kg/cm$^2$ and the moldings prepared from the composition.

If a gloss expressed by surface reflectance is less than a criterion of 80%, the inferiority thereof can be distinguished clearly from others with the naked eye and commercial value thereof is low. If an impact resistance expressed by Izod impact strength is less than 5 kg.cm/cm, general domestic moldings prepared therefrom, such as cases of vacuum cleaners, tend to be broken during a normal operation of the device in which the poor impact resistance material is used. If a rigidity expressed by elastic modulus in tension is less than 12,000 kg/cm$^2$, a great elastic deformation is apt to be caused in moldings which are similar to those mentioned above even when they are handled in a usual manner.

The polypropylene resin composition of the present invention comprises a propylene homopolymer and modifying agents, which is characterized in that as the propylene homopolymer, 100 parts by weight of propylene homopolymer (A) having an intrinsic viscosity in tetraline at 135° C. of no less than 1.9 is used (preferably, 1.9–2.5); and 40–150 parts by weight of ethylene/propylene copolymer (B) having an intrinsic viscosity in tetralin at 135° C. of 1.4–1.7 and an ethylene content of 2–15 molar % and 40–150 parts by weight of ethylene/propylene copolymer (C) having an intrinsic viscosity in tetralin at 135° C. of no less than 1.9, and an ethylene content of 2–20 molar % is used.

Ethylene/propylene copolymers suited to be (B) component, are random type copolymers and block type copolymers. Ethylene/propylene copolymers suited to be (C) component are block copolymers.

If component (A) is used alone, impact strength of moldings obtained therefrom is low, though gloss and rigidity are excellent. If component (B) is used alone, rigidity is low, though gloss and impact strength are excellent. If component (C) is used alone, gloss is poor, though rigidity and impact strenth are excellent. Even if two of the above three components are selected and combined together, it is impossible to satisfy all of the three requirements of gloss, rigidity and impact strenth. Under the circumstances as above, the above three components are mixed together in limited amounts to satisfy all of the three properties required according to the present invention.

A reason why the intrinsic viscosity of component (A) in tetralin at 135° C. is limited to no less than 1.9 is that if the intrinsic viscosity is less than 1.9, rigidity of the composition is low. The preferred intrinsic viscosity range of component (A) from 1.9 to 2.5. A reason why intrinsic viscosity of component (B) in tetralin at 135° C. is limited to 1.4–1.7 is that if intrinsic viscosity is less than 1.4, molecular weight of component (B) is low and, accordingly, rigidity, tensile strength and bending strength thereof are low and, on the other hand, if intrinsic viscosity is higher than 1.7, gloss, impact strength and moldability are low. A limiting viscosity of 1.5–1.6 is particularly preferred. A reason why ethylene content of component (B) is limited to 2–15 molar % is that with less than 2 molar % of ethylene, impact strength is low and, on the other hand, with more than 15 molar % of ethylene, gloss is poor. Particularly, if ethylene content is less than 2 molar % and limiting viscosity is less than 1.4, both impact strength and rigidity are very low. If ethylene content is higher than 15 molar % and intrinsic viscosity is higher than 1.7, gloss is very poor. A reason why component (B) is limited in amount to 40–150 parts by weight per 100 parts by weight of component (A) is that with less than 40 parts by weight of component (B), a satisfactory gloss cannot be obtained and, on the other hand, with more than 150 parts by weight of component (B), a satisfactory rigidity cannot be obtained. Particularly, 70–120 parts by weight are preferred. A reason why intrinsic viscosity of component (C) is limited to no less than 1.9 is that if intrinsic viscosity is less than 1.9, rigidity, tensile strength and bending strength are low. Particularly, intrinsic viscosity of 1.9–2.5 is preferred. A reason why ethylene content of component (C) is limited to 2–20 molar % is that with less than 2 molar %, impact resistance is low and, on the other hand, with more than 20 molar % of ethylene, rigidity is low. Particularly, an ethylene content of 3-5 molar % is preferred. A reason why component (C) is limited in amount to 40-150 parts by weight is that with less than 40 parts by weight of component (C), impact resistance and rigidity are low and, on the other hand, with more than 150 parts by weight of component (C), gloss is poor. Particularly, an amount of 70-120 parts by weight is preferred. As ethylene/propylene copolymers (B) and (C), block copolymers are most excellent with respect to impact strength. With respect to gloss, however, random ethylene/propylene copolymers are suitable as component (B).

According to the present invention, rigidity, heat distortion temperature and creep resistance can be further improved if 5-120 parts by weight of a powdery inorganic filler of an average particle diameter of no more than 0.8 μm are incorporated in the composition comprising components (A)-(C). A reason why average particle diameter is limited to no more than 0.8 μm is that if the average particle diameter is larger than 0.8 μm, gloss is reduced remarkably. The most preferred average particle diameter is less than 0.1 μm. A reason why amount of the powdery inorganic filler is limited to 5-120 parts by weight is that with less than 5 parts by weight thereof, the effects of the incorporation thereof can hardly be obtained and, on the other hand, with more than 120 parts by weight thereof, impact strength is reduced remarkably. Particularly, an amount of 15-100 parts by weight is preferred. As the powdery inorganic fillers, there may be mentioned, for example, calcium carbonate, magnesium carbonate, calcium hydroxide, magnesium hydroxide, aluminum hydroxide, calcium sulfate, calcium sulfite, talc and known pigments. Among those powdery inorganic fillers, calcium carbonate and talc of an average particle diameter of no more than 0.8 μm are preferred. Particularly, the former is excellent with respect to impact strength and the latter is excellent with respect to tensile strength. Both of them having an average diameter of no more than 0.8 μm exhibit a particularly great effect of improving rigidity, heat distortion temperature and creep resistance.

In the preparation of the composition of the present invention, the kneading can be effected by means of mixing rolls, extruders, kneaders, Bunbury mixers and rotary vane mixers (Henschel mixers). However, the kneading means are not limited particularly to those mentioned above.

The present invention will be illustrated more concretely by means of examples, comparative examples and examples of conventional compositions.

EXAMPLES 1-25 AND COMPARATIVE EXAMPLES 1-26

Components of each example shown in Table 1 and each comparative example shown in Table 2 were kneaded with electrically heated mixing rolls at 220° C., crushed with crusher and then molded into moldings with a screw in-line type injection molding machine. Molding temperature was 220° C., molding pressure 900 kg/cm², and mould temperature 50° C., respectively. Gloss, impact strength, rigidity and tensile strength of the moldings were determined. Izod impact strength was employed as a measure of impact strength and elastic modulus in tension was employed as a measure of rigidity. Surface reflectance was employed as a measure of gloss. Surface reflectance was measured with a general-purpose reflectance meter. Uniformity of coloring property of the moldings was also determined. In this test, 100 moldings colored in red were observed with the naked eye to examine whether they were colored uniformly or not. Intrinsic viscosity of each of ethylene/propylene components used was measured with a Ubbelohde viscometer in silicone-oil bath at 135° C.

Results of the determination in examples and comparative examples are shown in Tables 3 and 4, respectively.

EXAMPLES OF CONVENTIONAL COMPOSITIONS 1-14

Components of conventional compositions and properties of them are shown in Tables 5 and 6, respectively. The were formed and molded by the same procedure as in Examples 1-25.

TABLE 1

| | Component (A) propylene homopolymer | | Component (B) ethylene/propylene copolymer | | | Component (C) ethylene/propylene copolymer | | | Component (D) Inorganic filler | | |
|---|---|---|---|---|---|---|---|---|---|---|---|
| Example | Intrinsic viscosity | Amount (parts by weight) | Intrinsic viscosity | Ethylene content (molar %) | Amount (parts by weight) | Intrinsic viscosity | Ethylene content (molar %) | Amount (parts by weight) | Variety | Average particle diameter (μm) | Amount (parts by weight) |
| 1 | 1.9 | 100 | 1.4 | 2.0 | 40 | 1.9 | 2.0 | 40 | — | — | — |
| 2 | 1.9 | 100 | 1.4 | 20.0 | 150 | 1.9 | 15.0 | 150 | — | — | — |
| 3 | 1.9 | 100 | 1.7 | 2.0 | 40 | 2.2 | 2.0 | 40 | — | — | — |
| 4 | 1.9 | 100 | 1.7 | 20.0 | 150 | 2.2 | 15.0 | 150 | — | — | — |
| 5 | 1.9 | 100 | 1.4 | 3.0 | 100 | 1.9 | 15.0 | 100 | — | — | — |
| 6 | 2.1 | 100 | 1.4 | 10.0 | 65 | 2.0 | 10.0 | 35 | — | — | — |
| 7 | 2.2 | 100 | 1.6 | 5.0 | 40 | 2.2 | 5.0 | 40 | — | — | — |
| 8 | 1.9 | 100 | 1.6 | 10.0 | 100 | 2.1 | 7.0 | 100 | — | — | — |
| 9 | 2.0 | 100 | 1.4 | 15.0 | 70 | 1.9 | 8.0 | 70 | — | — | — |
| 10 | 2.1 | 100 | 1.4 | 20.0 | 50 | 2.0 | 5.0 | 75 | — | — | — |
| 11 | 2.1 | 100 | 1.6 | 7.0 | 50 | 2.1 | 10.0 | 40 | — | — | — |
| 12 | 2.1 | 100 | 1.7 | 5.0 | 40 | 2.2 | 7.0 | 40 | — | — | — |
| 13 | 2.1 | 100 | 1.5 | 7.0 | 40 | 2.3 | 7.0 | 70 | — | — | — |
| 14 | 2.1 | 100 | 1.4 | 5.0 | 150 | 1.9 | 5.0 | 40 | — | — | — |
| 15 | 1.9 | 100 | 1.4 | 2.0 | 40 | 1.9 | 2.0 | 40 | Calcium carbonate | 0.6 | 120 |
| 16 | 1.9 | 100 | 1.4 | 20.0 | 150 | 1.9 | 15.0 | 150 | Calcium carbonate | 0.08 | 120 |
| | | | | | | | | | Calcium | | |

TABLE 1-continued

| | Component (A) propylene homopolymer | | Component (B) ethylene/propylene copolymer | | | Component (C) ethylene/propylene copolymer | | | Component (D) Inorganic filler | | |
|---|---|---|---|---|---|---|---|---|---|---|---|
| Example | Intrinsic viscosity | Amount (parts by weight) | Intrinsic viscosity | Ethylene content (molar %) | Amount (parts by weight) | Intrinsic viscosity | Ethylene content (molar %) | Amount (parts by weight) | Variety | Average particle diameter (μm) | Amount (parts by weight) |
| 17 | 2.0 | 100 | 1.7 | 2.0 | 40 | 2.2 | 2.0 | 40 | Calcium carbonate | 0.6 | 50 |
| 18 | 2.0 | 100 | 1.7 | 20.0 | 150 | 2.2 | 15.0 | 150 | Calcium carbonate | 0.5 | 20 |
| 19 | 1.9 | 100 | 1.4 | 3.0 | 100 | 1.9 | 15.0 | 100 | Talc | 0.08 | 5 |
| 20 | 2.2 | 100 | 1.6 | 5.0 | 40 | 2.0 | 5.0 | 40 | Talc | 0.1 | 30 |
| 21 | 1.9 | 100 | 1.6 | 7.0 | 100 | 2.1 | 7.0 | 100 | Calcium carbonate | 0.2 | 10 |
| 22 | 2.1 | 100 | 1.6 | 7.0 | 60 | 2.0 | 3.0 | 40 | Calcium carbonate | 0.08 | 100 |
| 23 | 2.0 | 100 | 1.4 | 4.0 | 50 | 1.9 | 5.0 | 50 | Calcium carbonate | 0.3 | 80 |
| 24 | 1.9 | 100 | 1.5 | 5.0 | 40 | 2.0 | 5.0 | 60 | Calcium carbonate | 0.6 | 60 |
| 25 | 2.0 | 100 | 1.5 | 8.0 | 50 | 2.1 | 6.0 | 50 | Calcium carbonate | 0.2 | 40 |

TABLE 2

| | Component (A) | | Component (B) | | | Component (C) | | | Component (D) | | |
|---|---|---|---|---|---|---|---|---|---|---|---|
| Comp. Example | Intrinsic viscosity | Amount (parts by weight) | Intrinsic viscosity | Ethylene content (molar %) | Amount (parts by weight) | Intrinsic viscosity | Ethylene content (molar %) | Amount (parts by weight) | Variety | Average particle diameter (μm) | Amount (parts by weight) |
| 1 | 1.7 | 100 | 1.4 | 3.0 | 40 | 1.9 | 3.0 | 40 | — | — | — |
| 2 | 1.7 | 100 | 1.7 | 5.0 | 150 | 1.9 | 6.0 | 150 | — | — | — |
| 3 | 1.9 | 100 | 1.2 | 10.0 | 100 | 1.9 | 10.0 | 100 | — | — | — |
| 4 | 2.0 | 100 | 1.8 | 10.0 | 100 | 2.0 | 10.0 | 100 | — | — | — |
| 5 | 1.9 | 100 | 1.5 | 1.0 | 100 | 1.9 | 5.0 | 100 | — | — | — |
| 6 | 2.0 | 100 | 1.5 | 22.0 | 100 | 2.0 | 5.0 | 100 | — | — | — |
| 7 | 2.2 | 100 | 1.5 | 5.0 | 100 | 1.7 | 3.0 | 100 | — | — | — |
| 8 | 2.0 | 100 | 1.5 | 5.0 | 100 | 1.9 | 1.0 | 100 | — | — | — |
| 9 | 2.0 | 100 | 1.5 | 5.0 | 100 | 1.9 | 17.0 | 100 | — | — | — |
| 10 | 2.0 | 100 | 1.5 | 5.0 | 100 | — | — | — | — | — | — |
| 11 | 2.0 | 100 | — | — | — | 1.9 | 5.0 | 100 | — | — | — |
| 12 | — | — | 1.5 | 5.0 | 100 | 1.9 | 5.0 | 100 | — | — | — |
| 13 | 2.0 | 100 | 1.7 | 5.0 | 30 | 1.9 | 5.0 | 30 | — | — | — |
| 14 | 2.0 | 100 | 1.7 | 5.0 | 170 | 1.9 | 5.0 | 170 | — | — | — |
| 15 | 2.0 | 100 | 1.5 | 5.0 | 30 | 1.9 | 5.0 | 170 | — | — | — |
| 16 | 2.0 | 100 | 1.5 | 5.0 | 170 | 1.9 | 5.0 | 30 | — | — | — |
| 17 | 2.0 | 100 | 1.5 | 5.0 | 50 | 1.9 | 5.0 | 170 | — | — | — |
| 18 | 2.0 | 100 | 1.5 | 5.0 | 170 | 1.9 | 5.0 | 50 | — | — | — |
| 19 | 1.9 | 100 | 1.6 | 2.0 | 200 | 1.9 | 5.0 | 20 | — | — | — |
| 20 | 2.0 | 100 | 1.7 | 3.0 | 50 | 1.9 | 5.0 | 50 | Calcium carbonate | 1.0 | 100 |
| 21 | 1.7 | 100 | 1.6 | 5.0 | 50 | 2.0 | 5.0 | 50 | Talc | 1.0 | 120 |
| 22 | 2.0 | 100 | 1.6 | 5.0 | 50 | 2.0 | 5.0 | 50 | Calcium carbonate | 0.08 | 140 |
| 23 | 2.2 | 100 | 1.6 | 5.0 | 50 | 2.0 | 5.0 | 50 | Calcium carbonate | 0.08 | 3 |
| 24 | 2.1 | 100 | 1.7 | 5.0 | 50 | 1.9 | 5.0 | 50 | Calcium carbonate | 0.08 | 150 |
| 25 | 2.0 | 100 | 1.7 | 5.0 | 100 | 1.9 | 5.0 | 100 | Calcium carbonate | 1.5 | 100 |
| 26 | 1.9 | 100 | 1.7 | 5.0 | 100 | 1.9 | 5.0 | 30 | Calcium carbonate | 1.5 | 100 |

TABLE 3

Properties of Compositions of Examples 1-25

| Ex. | Surface reflectance (%) | Izod impact strength (Kg·cm/cm²) | Elastic modulus in tension (kg/cm²) | Tensile strength (kg/cm²) | Coloring property (%) |
|---|---|---|---|---|---|
| 1 | 88 | 5.1 | 13500 | 315 | 100 |
| 2 | 84 | 8.0 | 12700 | 275 | 100 |
| 3 | 88 | 5.2 | 13400 | 300 | 100 |
| 4 | 84 | 7.7 | 13000 | 310 | 100 |
| 5 | 86 | 5.9 | 13500 | 285 | 100 |
| 6 | 85 | 5.9 | 13200 | 295 | 100 |
| 7 | 87 | 5.2 | 13200 | 300 | 100 |
| 8 | 88 | 6.0 | 13100 | 280 | 100 |
| 9 | 85 | 6.0 | 13200 | 290 | 100 |
| 10 | 83 | 6.1 | 13000 | 280 | 100 |
| 11 | 85 | 5.3 | 13100 | 305 | 100 |
| 12 | 85 | 5.1 | 13200 | 310 | 100 |

TABLE 3-continued

Properties of Compositions of Examples 1-25

| Ex. | Surface reflectance (%) | Izod impact strength (Kg. cm/cm$^2$) | Elastic modulus in tension (kg/cm$^2$) | Tensile strength (kg/cm$^2$) | Coloring property (%) |
|---|---|---|---|---|---|
| 13 | 83 | 5.3 | 13600 | 310 | 100 |
| 14 | 84 | 6.2 | 13500 | 290 | 100 |
| 15 | 80 | 5.0 | 14900 | 300 | 98 |
| 16 | 80 | 6.5 | 13700 | 270 | 98 |
| 17 | 80 | 5.0 | 13900 | 290 | 99 |
| 18 | 80 | 6.1 | 13500 | 305 | 100 |
| 19 | 82 | 5.8 | 13200 | 295 | 100 |
| 20 | 83 | 5.1 | 14600 | 300 | 99 |
| 21 | 83 | 5.4 | 13200 | 295 | 100 |
| 22 | 80 | 5.1 | 14000 | 280 | 98 |
| 23 | 80 | 5.0 | 13800 | 288 | 99 |
| 24 | 81 | 5.1 | 13700 | 295 | 99 |
| 25 | 82 | 5.3 | 13200 | 300 | 99 |

Note:
Numerals in the column of coloring property indicate percentages of uniformly colored moldings

TABLE 4

Properties of Compositions of Comparative Examples 1-25

| Comparative Example | Surface reflectance (%) | Izod impact strength (kg. cm/cm$^2$) | Elastic modulus in tension (kg/cm$^2$) | Tensile strength (kg/cm$^2$) | Coloring property (%) |
|---|---|---|---|---|---|
| 1 | 87 | 4.7 | 10200 | 240 | 100 |
| 2 | 82 | 7.5 | 9700 | 210 | 100 |
| 3 | 88 | 5.0 | 9800 | 230 | 100 |
| 4 | 70 | 3.5 | 13200 | 290 | 100 |
| 5 | 85 | 3.2 | 13500 | 305 | 100 |
| 6 | 68 | 8.0 | 9200 | 230 | 100 |
| 7 | 82 | 5.5 | 9800 | 230 | 100 |
| 8 | 82 | 3.0 | 13600 | 315 | 100 |
| 9 | 83 | 6.0 | 10000 | 250 | 100 |
| 10 | 88 | 7.5 | 9800 | 230 | 100 |
| 11 | 58 | 3.3 | 13500 | 280 | 100 |
| 12 | 52 | 8.0 | 11200 | 260 | 100 |
| 13 | 70 | 2.8 | 13800 | 290 | 100 |
| 14 | 68 | 8.7 | 12100 | 270 | 100 |
| 15 | 55 | 6.2 | 11900 | 270 | 100 |
| 16 | 87 | 4.2 | 9900 | 260 | 100 |
| 17 | 68 | 6.5 | 12200 | 270 | 100 |
| 18 | 85 | 5.1 | 10300 | 260 | 100 |
| 19 | 87 | 7.5 | 9300 | 220 | 100 |
| 20 | 60 | 5.0 | 14100 | 285 | 97 |
| 21 | 52 | 5.0 | 14500 | 290 | 97 |
| 22 | 68 | 3.2 | 15200 | 210 | 97 |
| 23 | 84 | 6.1 | 11900 | 280 | 100 |
| 24 | 72 | 3.5 | 15600 | 260 | 97 |
| 25 | 57 | 4.2 | 14300 | 270 | 97 |
| 26 | 72 | 2.5 | 14600 | 280 | 100 |

Note:
Numerals in the column of coloring property indicate percentages of uniformly colored moldings

TABLE 5

| Examples of conventional compositions | Component (A) Intrinsic viscosity | Component (A) Amount (parts by weight) | Components (B) Intrinsic viscosity | Components (B) Ethylene content (molar %) | Components (B) Amount (parts by weight) | Component (C) Intrinsic viscosity | Component (C) Ethylene content (molar %) | Component (C) Amount (parts by weight) | Component (D) Variety | Component (D) Average particle diameter (μm) | Component (D) Amount (parts by weight) |
|---|---|---|---|---|---|---|---|---|---|---|---|
| 1 | 1.9 | — | — | — | — | — | — | — | — | — | — |
| 2 | 1.7 | — | — | — | — | — | — | — | — | — | — |
| 3 | — | — | 1.4 | 3 | — | — | — | — | — | — | — |
| 4 | — | — | 1.7 | 5 | — | — | — | — | — | — | — |
| 5 | — | — | 1.2 | 10 | — | — | — | — | — | — | — |
| 6 | — | — | — | — | — | 1.9 | 5.0 | — | — | — | — |
| 7 | — | — | — | — | — | 2.0 | 1.0 | — | — | — | — |
| 8 | — | — | — | — | — | 1.9 | 22.0 | — | — | — | — |
| 9 | — | — | — | — | — | 2.0 | 5.0 | — | — | — | — |
| 10 | — | — | — | — | — | 2.0 | 4.0 | 100 | Calcium carbonate | 3.5 | 400 |
| 11 | — | — | — | — | — | 2.0 | 5.0 | 100 | Calcium carbonate | 3.5 | 300 |
| 12 | — | — | — | — | — | 2.1 | 3.0 | 100 | Calcium carbonate | 3.5 | 200 |
| 13 | — | — | — | — | — | 2.2 | 3.0 | 100 | Calcium carbonate | 3.5 | 100 |
| 14 | — | — | — | — | — | 2.2 | 2.0 | 100 | Calcium carbonate | 3.5 | 200 |
| 15 | 2.0 | 80 | ethylene/propylene rubber | | | | | | — | — | — |
| 16 | 2.0 | 50 | ethylene/propylene rubber | | | | | | Calcium carbonate | 1.0 | 50 |

Note:
In Examples of conventional compositions 15 and 16, components (B) and (C) were replaced with ethylene propylene rubber having very low elastic modulus, e.g. 1000kg/cm$^2$ or less

TABLE 6

Properties of Conventional Compositions Examples 1-16

| Examples conventional composition | Surface reflectance (%) | Izod impact strength (kg. cm/cm$^2$) | Elastic modulus in tension (kg/cm$^2$) | Tensile strength (kg/cm$^2$) | Coloring property (%) |
|---|---|---|---|---|---|
| 1 | 87 | 1.0 | 13500 | 330 | 100 |
| 2 | 86 | 10.2 | 8500 | 230 | 100 |

TABLE 6-continued

| | Properties of Conventional Compositions Examples 1-16 | | | | |
|---|---|---|---|---|---|
| Examples conventional composition | Surface reflectance (%) | Izod impact strength (kg. cm/cm²) | Elastic modulus in tension (kg/cm²) | Tensile strength (kg/cm²) | Coloring property (%) |
| 3 | 87 | 6.0 | 9000 | 250 | 100 |
| 4 | 88 | 7.5 | 9700 | 220 | 100 |
| 5 | 88 | 6.8 | 7200 | 210 | 100 |
| 6 | 28 | 6.8 | 12200 | 270 | 100 |
| 7 | 60 | 2.5 | 13000 | 300 | 100 |
| 8 | 25 | 10.0 | 11200 | 290 | 100 |
| 9 | 25 | 6.0 | 12000 | 305 | 100 |
| 10 | 18 | 1.5 | 18000 | 290 | 68 |
| 11 | 20 | 1.7 | 17500 | 295 | 73 |
| 12 | 22 | 2.0 | 15100 | 285 | 86 |
| 13 | 22 | 3.0 | 14200 | 280 | 90 |
| 14 | 22 | 2.2 | 15000 | 280 | 86 |
| 15 | 67 | 8.5 | 9700 | 150 | 100 |
| 16 | 25 | 5.2 | 12000 | 180 | 80 |

Note:
Numerals in the column of coloring property indicate percentages of uniformly colored moldings In moldings, particularly general-purpose moldings, coloring property is very important. The coloring property is one of the great important factors of commercial value.

Components (B) of 1~10 in Table 1 are random copolymers and of 11~25 in Table 1 are block copolymers.

Components (B) of 1~10 in Table 2 are random copolymers and of 11~26 in Table 2 are block copolymers.

Components (C) in Table 1 and 2 are block copolymers.

What is claimed is:

1. A polypropylene resin composition comprising (A) 100 parts by weight of propylene homopolymer having an intrinsic viscosity in tetralin at 135° C. of no less than 1.9; and (B) 40-150 parts by weight of ethylene/propylene copolymer having an intrinsic viscosity in tetralin at 135° C. of 1.4-1.7 and an ethylene content of 2-15 molar % and (C) 40-150 parts by weight of a block ethylene/propylene copolymer having an intrinsic viscosity in tetralin at 135° C. of no less than 1.9 and an ethylene content of 2-20 molar %.

2. A polypropylene resin composition according to claim 1, wherein ethylene/propylene copolymer (B) is a block copolymer.

3. A polypropylene resin composition according to claim 1, wherein the ethylene/propylene copolymer (B) is a random copolymer.

4. A polypropylene resin composition comprising (A) 100 parts by weight of propylene homopolymer having an intrinsic viscosity in tetralin at 135° C. of no less than 1.9; (B) 40-150 parts by weight of ethylene/propylene copolymer having an intrinsic viscosity in tetralin at 135° C. of 1.4-1.7 and an ethylene content of 2-15 molar % and (C) 40-150 parts by weight of a block ethylene/propylene copolymer having an intrinsic viscosity in tetralin at 135° C. of no less than 1.9 and an ethylene content of 2-20 molar %; and (D) 5-120 parts by weight of a powdery inorganic filler of an average particle diameter of no more than 0.8 μm.

5. A polypropylene resin composition according to claim 4, wherein both of the ethylene/propylene copolymer (B) is a block copolymer.

6. A polypropylene resin composition according to claim 4, wherein the ethylene/propylene copolymer (B) is a random copolymer.

7. A polypropylene resin composition according to claim 4, wherein the powdery inorganic filler (D) is at least one member selected from the group consisting of calcium carbonate and talc of an average particle diameter of no more than 0.8 μm.

8. A polypropylene resin composition comprising 100 parts by weight of a propylene homopolymer (A) having an intrinsic viscosity in tetralin at 135° C. of 1.9-2.5; 70-120 parts by weight of a block ethylene/propylene copolymer (B) having an intrinsic viscosity in tetralin at 135° C. of 1.5-1.6 and an ethylene content of 4-7 molar %; 70-120 parts by weight of a block ethylene/propylene copolymer (C) having an intrinsic viscosity in tetralin at 135° C. of 1.9-2.5 and an ethylene content of 3-5 molar % and 15-100 parts by weight of a powdery inorganic filler of an average particle diameter of less than 0.1 μm.

9. Polypropylene resin moldings having a surface reflectance of higher than 80%, an Izod impact strength of higher than 5 kg.cm/cm and an elastic modulus in tension of higher than 12,000 kg/cm² which is prepared by molding a polypropylene resin composition comprising 100 parts by weight of propylene homopolymer (A) having an intrinsic viscosity in tetralin at 135° C. of no less than 1.9; 40-150 parts by weight of ethylene/propylene copolymer (B) having an intrinsic viscosity in tetralin at 135° C. of 1.4-1.7 and an ethylene content of 2-15 molar % and 40-150 parts by weight of a block ethylene/propylene copolymer (C) having an intrinsic viscosity in tetralin at 135° C. of no less than 1.9 and ethylene content of 2-20 molar %.

10. Polypropylene resin moldings having a surface reflectance of higher than 80%, an Izod impact strength of higher than 5 kg.cm/cm and an elastic modulus in tension of higher than 12,000 kg/cm², which is prepared by molding a polypropylene resin composition comprising 100 parts by weight of propylene homopolymer (A) having an intrinsic viscosity in tetralin at 135° C. of no less than 1.9; 40-150 parts by weight of ethylene/propylene copolymer (B) having an intrinsic viscosity in tetralin at 135° C. of 1.4-1.7 and an ethylene content of 2-15 molar % and 40-150 parts by weight of a block ethylene/propylene copolymer (C) having an intrinsic viscosity in tetralin at 135° C. of no less than 1.9 and an ethylene content of 2-20 molar %; and 5-120 parts by weight of a powdery inorganic filler of an average particle diameter of no more than 0.8 μm.

11. Polypropylene resin moldings according to claim 9, wherein the ethylene/propylene copolymer (B) is a block copolymer, or a random copolymer.

12. Polypropylene resin moldings according to claim 10, wherein the ethylene/propylene copolymer (B) is a block copolymer or a random copolymer.

13. Polypropylene resin moldings according to claim 9, wherein the ethylene/propylene copolymer (B) is a block copolymer.

14. Polypropylene resin moldings according to claim 10, wherein the copolymer (B) is a random copolymer.

15. Polypropylene resin moldings according to claim 10, wherein the composition comprises 100 parts by weight of the propylene homopolymer (A) having an intrinsic viscosity in tetralin at 135° C. of 1.9–2.5; 70–120 parts by weight of the ethylene/propylene copolymer (B) having an intrinsic viscosity in tetralin at 135° C. of 1.5–1.6 and an ethylene content of 4–7 molar % and 70–120 parts by weight of the ethylene/propylene homopolymer (C) having an intrinsic viscosity in tetralin at 135° C. of 1.9–2.5 and an ethylene content of 3–5 molar %; and 15–100 parts by weight of powdery inorganic filler (D) of an average particle diameter of less than 0.1 μm.

* * * * *